June 16, 1931. A. B. CONKLIN 1,810,161
ELECTRICALLY ILLUMINATED ADVERTISING DEVICE
Filed March 24, 1930   2 Sheets-Sheet 1
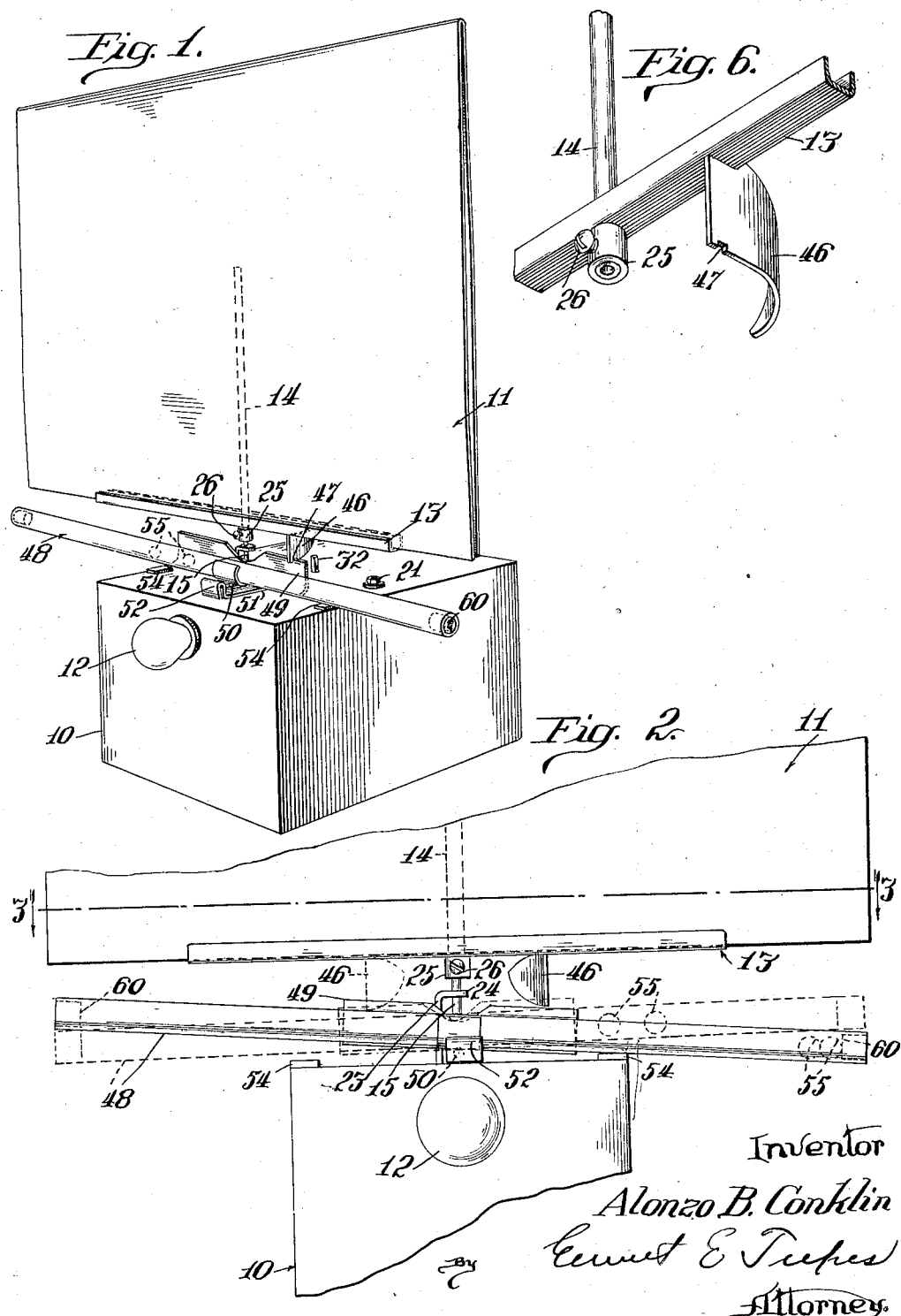
Inventor
Alonzo B. Conklin
Ernest E. Tupes
Attorney June 16, 1931.  A. B. CONKLIN  1,810,161
ELECTRICALLY ILLUMINATED ADVERTISING DEVICE
Filed March 24, 1930  2 Sheets-Sheet 2
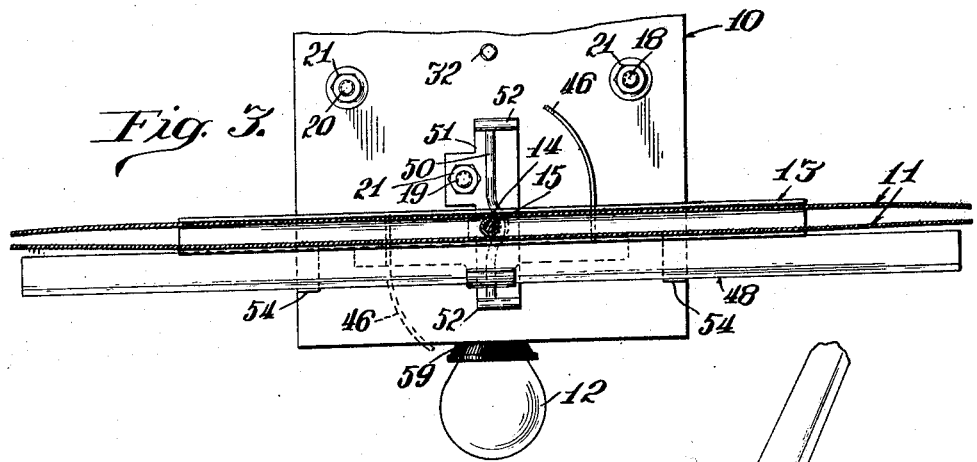
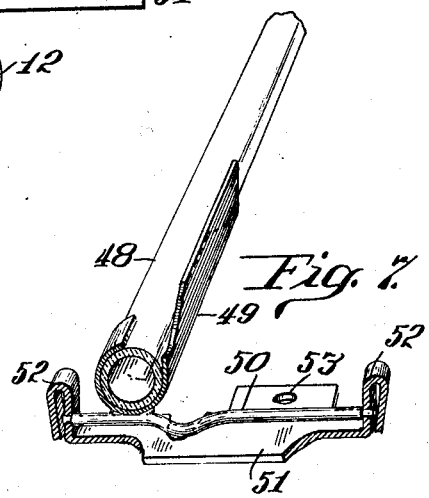
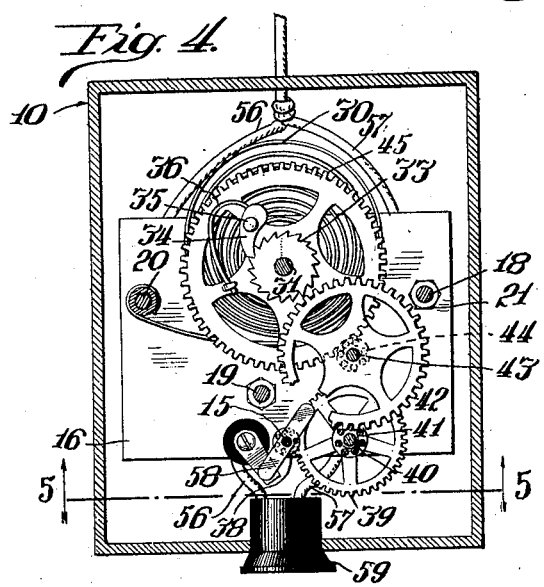
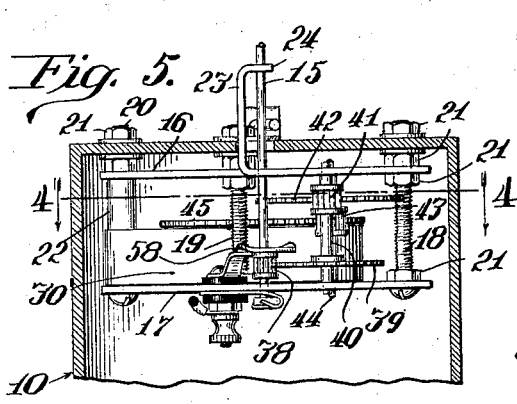
Inventor:
Alonzo B. Conklin
Attorney.

Patented June 16, 1931

1,810,161

UNITED STATES PATENT OFFICE

ALONZO B. CONKLIN, OF CHICAGO, ILLINOIS

ELECTRICALLY ILLUMINATED ADVERTISING DEVICE

Application filed March 24, 1930. Serial No. 438,288.

The invention relates to electrically illuminated advertising devices and more particularly it relates to advertising devices wherein an electric lamp is flashed on and off at time intervals corresponding to the periods of exposure and eclipse respectively of display material carried by a revolving or otherwise movable sign or display board so positioned as to be illuminated by the lamp.

An object of the invention is the provision of novel means for starting and stopping the movement of the sign or display sheet in synchronization with the flashing on and off of the illuminating lamp.

Another object of the invention is the provision in a device of the kind described of novel means for actuating a sign board and a display sheet and for opening and closing a lamp circuit with the requisite periodicity in order that the display sheet may be automatically brought to a stop in a position to be illuminated by the lamp when flashed on and moved to its next position of exposure while the lamp is turned off.

A further object of the invention is the provision of an advertising device of the kind described which is novel, simple, compact, durable and satisfactory for its intended purpose.

Many other objects and advantages of the construction herein shown and described will be obvious to those skilled in the art from the disclosure herein given.

To this end the invention consists in the novel construction, arrangement and combination of parts herein shown and described and more particularly pointed out in the claims.

In the drawings wherein like numerals indicate like or corresponding parts:

Fig. 1 is a perspective view of an advertising device embodying the principles of the invention;

Fig. 2 is front elevational view of the device shown in Fig. 1 drawn to a larger scale;

Fig. 3 is a view along the line 3—3 of Fig. 2;

Fig. 4 is a sectional view through a casing in which the actuating mechanism of the device is housed, the view being taken along the line 4—4 of Fig. 5;

Fig. 5 is a fragmentary sectional view along the line 5—5 of Fig. 4;

Fig. 6 is a perspective view, drawn to a large scale, of a portion of the mounting for the display sheet or board forming a portion of the invention;

Fig. 7 is a perspective view of a fragmentary portion of trip releasing and holding mechanism automatically operable to control the movement of the display sheet or board; and Fig. 8 is a longitudinal section through one end of a tube forming part of the structure shown in Fig. 7.

Referring now more particularly to the drawings, the device is shown as comprising a casing 10 upon which a sign or a display sheet or board 11 is mounted to rotate about a vertical axis. The casing 10 provides a housing for the mechanism operable to rotate the sheet or board 11 and for the wiring and the switch connecting a lamp 12 with a source of electrical energy, not shown. The lamp is mounted on the front wall of the casing 10 in a position to illuminate the corresponding face of the sheet 11.

The casing 10 may be constructed of any desired material suitable for forming a cabinet like housing. The device may be mounted in any conspicuous place such as upon a counter or the like or in a window, where it is exposed to public gaze. The space requirements for the installation are determined by the length of the sheet or board 11. The board 11 is formed as shown by folding a sheet of material to provide two leaves connected along their top edges with their lower free ends positioned in a channel member 13. The channel member 13 and a hollow vertical rod 14, projecting upwardly therethrough, are caused to rotate through an angle of 180 degrees as hereinafter more particularly described, and in so rotating carry along the display sheet or board 11.

The board 11 may provide a mounting for any one of a plurality of sheets of paper folded transversely along their median line with the free ends tucked in the channel 13, such sheets carrying printed material or pictorial illustrations on the exposed pages and thereby enabling a variety of matter to be inexpensively displayed by merely substituting one sheet for another. By making the board or sheet 11 of transparent material, sheets of display material can be mounted on the device and exposed to view for any desired length of time by inserting the same between the leaves forming the sheet. The device presents the further alternative of utilizing material for the board or sheet 11 suitable for printing or otherwise forming the advertising material thereon and by providing a plurality of such sheets the desired variety of advertising material can also be obtained.

The channel member 13 and the sheet or board 11 are connected, by a shaft 15, with actuating mechanism contained within the casing 10. A sleeve 25 fixedly mounted on the under side of the member 13 contains the lower end of the hollow rod 14. The shaft 15 has its upper end telescoping both the sleeve 25 and the hollow rod 14. A screw 26 provides means for clamping the rod 14 and the sleeve 25 in fixed relation to the shaft 15. By loosening the screw 26, the sheet or board 11 and channel member 13 can be moved both longitudinally of and rotated relative to the shaft 15, thereby permitting the sheet or board 11 to be raised relative to the casing 10 and adjusted angularly as desired relative to the casing.

The lower end of the shaft 15 rests upon and has a journaled bearing on a plate 17. The plate 17 is suspended from the top of the casing 10 by bolts 18, 19 and 20 and spaced apart from a plate 16 positioned above and similarly suspended from the casing. The near edge of plate 16 is partially severed and turned upwardly to form an L shaped guide member 23 for the shaft 15. The upper end 24 of the member 23 is apertured to receive the shaft 15 and to provide a bearing, permitting rotation of the shaft without oscillation, under the load of the sheet 11.

The plates 16 and 17 are fastened in fixed relation each to the other and to the top wall of the casing 10 by means of a plurality of nuts 21 and are utilized as a mounting for mechanism operating to rotate the shaft 15, the sheet 11 and the material carried thereby. The actuating mechanism includes a clock spring 30, operatively connected with the shaft 15 by a system of step up pinions and gears, whereby a very slight movement of the spring causes the shaft 15 and sheet 11 carried thereby to turn through one half a revolution. The free end of the spring 30 is fastened about a sleeve 22, mounted upon the bolt 20. The inner end of the spring 30 is fastened to a shaft 31 journalled in the plates 16 and 17. The upper end 32 of the shaft 31 is made angular in cross section and projects through the top of the casing 10 to permit the spring 30 to be wound by attaching a key thereto and rotating the same in the usual manner of winding a clock. A ratchet wheel 33 mounted on the shaft 31 and a ratchet arm 34 pivoted on 35 prevents the unwinding of the spring 30 except as hereinafter described. A resilient arm 36 serves to hold the ratchet 34 in operative engagement with the wheel 33 except when released to permit the spring 30 to actuate the device.

The system of gears and pinions operatively connecting the shaft 15 on which the display sheet 11 is mounted, with the shaft 31 to which the spring 30 is connected, includes a pinion 38 mounted on the shaft 15; a gear 39 mounted on a shaft 40 and operatively connected with the pinion 38; a pinion 41 mounted on the shaft 40 and operatively engaging a gear 42 mounted on a shaft 43; a pinion 44 mounted on the shaft 43 and operatively engaging the shaft 31 upon which the spring 30 acts directly.

It is obvious that upon release of the ratchet wheel 33 from engagement with the ratchet arm 34, the stored up energy of the spring 30 will act to rotate the shaft 15 in counter clockwise direction, as observed in Fig. 4. Rotation of the shaft 15 will carry with it the channel member 13 and the sheet 11 as already described. A holding device or latch 46 is mounted on the under edge of the channel member 13 at some distance from the vertical axis of rotation so that the latch sweeps over a circular path of substantial diameter. The latch 46 is preferably curved to conform to its circular path and has its upper and lower edges tapering to a point at its projecting forward end. The rear end of the latch 46 terminates in substantial alignment with the channel member 13 and has a notch 47 in its lower face for a purpose hereinafter more particularly described.

Gravity actuated means operable intermittently to control starting and stopping of the device is provided and takes the form of a transversely extending tube 48 mounted on the top of the casing 10, underneath and immediately in front of the display sheet 11. A longitudinally extending plate 51 is fastened to the casing 10 by means of screws or the like, not shown, such screws being positioned in holes 53 provided for that purpose, as best shown in Fig. 7. The ends of the plate 51 form standards 52 in which the ends of a pivot rod 50 are journaled. A clip plate 49, fixedly fastened to the rod 50, provides a mounting for the tube 48 permitting its rotation about the rod as an axis. The amount of rotation of the tube 48 about a horizontal axis is limited by its proximity to the upper face of the casing 10 and by its contact with stop members 54, positioned one on either edge of the casing cover. The members 54 may be constructed of felt or other shock absorbing material.

The clip plate 49 is of substantial length and has its rear edge projecting upwardly a sufficient amount that the lower tapering edge of the latch 46, in sweeping through its circumferential path with the channel member 13, contacts with the upper edge of the plate and acts as a cam tending to tilt the plate and the corresponding end of the tube 48 downwardly. The upper edge of the plate 49 is thereby caused to enter the notch 47 in the latch 46 and as a result the rotation of the display sheet 11 and of the channel member 13 is brought to a sudden stop.

The mounting of the tube 48 is such that it is slightly inclined downwardly towards the latch 46 when the plate 49 is in the notch 47. A pair of heavy balls 55, contained in the tube 48 are permitted by this inclination to roll towards the end of the tube thus lowered as shown in Fig. 2. The weight of the balls 55 is sufficient to lower that end of the tube 48 to a point where the plate 49 is released from the notch 47. Immediately following such release, the shaft 15 again starts rotating under the force exerted by the spring 30 through the system of gears and pinions, connecting it with the shaft 31. Such rotation continues through 180 degrees when the latch 46 is brought into contact with the opposite end of the plate 49 and the rotation brought to a sudden stop by the plate entering the notch 47. The tube 48 is now sloping downwardly away from the balls 55 which have remained in the other end of the tube during the rotation of the latch 46 through one half of a revolution. The balls 55 are caused by gravity to move through the tube 48 to that end of the tube in contact with the latch 46 and their weight lowers that end of the tube sufficiently to release the latch and permit another half revolution of the shaft 15 and of the display card or plate 11 carried thereby. This operation will be continued as long as the energy in the spring 30 is sufficient to actuate the shaft 15. The spring 30 can be constructed to require winding daily or weekly as desired and the rotation of the display card will be continued without requiring any attention. It is to be noted that the screw 26 permits the display card 11 to be adjusted so as to keep it parallel with the front wall of the casing 10 when it is latched against rotation. The balls 55 are inserted through an open end of the tube 48 and the ends of the tube closed by plugs 60. The plugs 60 are preferably constructed of cork or similar material capable of receiving the impact of the balls 55 and causing their rebound. The tube 48 is preferably of glass or other transparent material. It is desirable that the lamp 12 be lighted when the display board or sheet 11 is stationary and switched off when the band is rotating. This flashing on and off of the lamp 12 is desirable not only for the saving of energy but also because it attracts attention to the display. For this purpose the lamp 12 is mounted in a circuit that is closed when the sheet 11 is stationary and is broken during rotation of the same. The circuit comprises a pair of conductors 56 and 57. The conductor 56 is in two parts connected by a binder post mounted on the plate 17 and switch 58 rotatable with the shaft 15. The conductor 57 is continuous and both it and the conductor 56 are connected with an insulated lamp socket 59 mounted in the front wall of the casing 10 to receive the lamp 12. The switch 58 is fixedly mounted on the shaft 15 and is shown in Fig. 4 in a position to close the circuit and cause the lamp 12 to be illuminated. This position of the switch 58 corresponds to the stationary position of the shaft 15, wherein the display sheet 11 is also stationary and is parallel to the tube 48. Upon release of the latch 46 from the plate 49, rotation of the shaft 15 carries with it the switch 58, breaking the circuit and darkening the lamp during the half revolution. The shaft 15 again stops at a point wherein the switch 58 has also been revolved 180 degrees with the result that the circuit is again closed and the light is again flashed on. It will be observed that the circuit is intermittently closed and broken automatically by the same mechanism that automatically turns the display device through 180 degrees and that the operation of the device is synchronized with the illumination.

Thus it will be seen that the invention provides novel and simple means for actuating an intermittently movable advertising device and for synchronizing such movement with a lamp intermittently illuminating the device.

What I claim as new and desire to secure by Letters Patent is:

1. In a device of the kind described, a rotatable member, spring means tending to rotate said member continuously, a latch member fixedly mounted upon the rotatable member and carried thereby in a circumferential path, a balanced stop member mounted to oscillate about a horizontal axis underneath the rotatable member, gravity actuated means operable to alternately tilt the opposite ends of said stop member into the path of said latch member thereby stopping the rotation of said rotatable member twice during a complete rotation and releasing said rotatable member after a predetermined interval.

2. In a device of the kind described, a rotatable member, spring means tending to rotate said member continuously, a latch member fixedly mounted upon the rotatable member and carried thereby in a circumferential path, a balanced stop member mounted to oscillate about a horizontal axis underneath the rotatable member, gravity actuated means operable to alternately tilt the opposite ends of said stop member into the path of said latch member thereby stopping the rotation of said rotatable member twice during a complete rotation and releasing said rotatable member after a predetermined interval, an electric lamp positioned to illuminate said rotatable member, a switch for said lamp, said spring means operable to open and close said switch in synchronization with the intermittent rotation of said lamp.

3. In a device of the kind described, a display rack rotatable about a vertical axis, a latch member mounted on one end of the rack, spring means operable to continuously rotate the rack, a balanced tube mounted to oscillate about a horizontal axis underneath said rack, a globular member mounted in and free to roll from end to end of the tube, a plate projecting upwardly from the tube and movable by the oscillation of the tube into and out of the path of said latch member at diametrically opposite points, the under face of said latch member providing a cam to tilt the plate downwardly, the cam surface of the latch member having a face forming an abutment contacting with said plate and stopping the rotation of the rack at a point where the tube is tilted slightly below the horizontal, thereby permitting the globular member to roll towards said lowered end of the tube, the weight of said globular member causing said low end of the tube to be further lowered to a point releasing the plate from contact with the latch member and permitting further rotation of the rack for the purpose described.

4. In a device of the kind described, a display rack rotatable about a vertical axis, a latch member mounted on one end of the rack, spring means operable to continuously rotate the rack, a balanced tube mounted to oscillate about a horizontal axis underneath said rack, a globular member mounted in and free to roll from end to end of the tube, a plate projecting upwardly from the tube and movable by the oscillation of the tube into and out of the path of said latch member at diametrically opposite points, the under face of said latch member providing a cam to tilt the plate downwardly, the cam surface of the latch member having a face forming an abutment contacting with said plate and stopping the rotation of the rack at a point where the tube is tilted slightly below the horizontal, thereby permitting the globular member to roll towards said lowered end of the tube, the weight of said globular member causing said low end of the tube to be further lowered to a point releasing the plate from contact with the latch member and permitting further rotation of the rack for the purpose described, a lamp positioned to illuminate one side of the rack, conductors connecting the lamp with a source of electrical energy, and a switch controlling said circuit, said spring actuated means operable to open and close said switch in synchronization with the movement of the rack.

5. In a device of the kind described, a member rotatable about a vertical axis, with means tending to operate said member continuously, a latch member mounted on said rotatable member, said latch member having its lower edge portion curved upwardly and forwardly to form a cam surface and having a notch in its lower edge portion, gravity actuated means intermittently engaging and releasing the latch member to respectively stop and permit the rotation of said rotatable member, said gravity actuated means comprising a substantially balanced member having a limited oscillation about a horizontal axis underneath the rotatable member, said balanced member forming a runway for a globular member mounted therein, the end of said balanced member containing the globular member being thereby titled out of and the opposite end titled into the circumferential path of said latch member, the cam surface of said rotating latch member contacting with the elevated end of the balanced member and camming the same to a slightly depressed position, said balanced member simultaneously engaging said notch in the latch member and thereby stopping the rotation of the latch member and the rotatable member carrying the latch member, the resultant movement of the globular member still further lowering the depressed end of the balanced member to a point where it is released from holding engagement with the latch member, said rotatable member being then moved by the spring actuated means to a point where the latch member operatively engages the opposite elevated end of the balanced member and the process is repeated.

6. In a device of the kind described, a member rotatable about a vertical axis, an electric lamp positioned to illuminate the rotatable member, means forming a circuit connecting the lamp with a source of electrical energy, a switch operable to open and close the circuit, means tending to operate said member continuously, a latch member mounted on said rotatable member, said latch member having its lower edge portion curved upwardly and forwardly to form a cam surface and having a notch in its lower edge portion, gravity actuated means intermittently engaging and releasing the latch member to respectively stop and permit the rotation of said rotatable member, said gravity actuated means comprising a substantially balanced member having a limited oscillation about a horizontal axis underneath the rotatable member, said balanced member forming a runway for a globular member mounted therein, the end of said balanced member containing the globular member being thereby titled out of and the opposite end titled into the circumferential path of said latch member, the cam surface of said rotating latch member contacting with the elevated end of the balanced member and camming the same to a slightly depressed position, said balanced member simultaneously engaging said notch in the latch member and thereby stopping the rotation of the latch member and the rotatable member carrying the latch member, the resultant movement of the globular member still further lowering the depressed end of the balanced member to a point where it is released from holding engagement with the latch member, said rotatable member being then moved by the spring actuated means to a point where the latch member operatively engages the opposite elevated end of the balanced member and the process is repeated, said spring actuated means operating to close said switch when the balanced member is in engagement with the latch member and to open the switch when the latch member is moving to the next point of contact with the balanced member.

7. In a device of the kind described, a member rotatable about a vertical axis, spring means tending to continuously rotate said member, a latch member mounted on the lower edge of the rotatable member, on one side of its axis of rotation, a tube positioned underneath said member and balanced about a horizontal axis intersecting said vertical axis, a globular member movable by gravity from end to end of the tube, upwardly projecting stop plates mounted on the tube on opposite sides of the axis of rotation of said tube, said plates both lying in the path of the latch member when the tube is horizontal, the lower edge of said latch member forming a cam forcing the stop members and the corresponding end of the tube downwardly in turn as the rotatable member is revolved, the cam face of said latch member having a notch providing an abutment engaging with the stop plate and bringing the rotatable member to a stop with the adjacent end of the tube tilted downwardly, the weight of the globular member being sufficient to further tilt the tube downwardly and disengage the latch member from the stop member when the globular member rolls to the extreme end of the tube.

In witness whereof, I hereunto subscribe my name this 10th day of March, A. D. 1930.

ALONZO B. CONKLIN.